United States Patent
Little

(10) Patent No.: US 10,657,408 B2
(45) Date of Patent: May 19, 2020

(54) SPEAKER SPIDER MEASUREMENT TECHNIQUE

(71) Applicant: Sonos, Inc., Santa Barbara, CA (US)

(72) Inventor: Richard Warren Little, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 658 days.

(21) Appl. No.: 15/248,921

(22) Filed: Aug. 26, 2016

(65) Prior Publication Data

US 2018/0061073 A1    Mar. 1, 2018

(51) Int. Cl.
| | | |
|---|---|---|
| G06T 7/60 | (2017.01) | |
| G06K 9/46 | (2006.01) | |
| H04R 29/00 | (2006.01) | |
| G06T 7/00 | (2017.01) | |
| H04R 9/04 | (2006.01) | |

(52) U.S. Cl.
CPC .......... G06K 9/4671 (2013.01); G06T 7/001 (2013.01); G06T 7/0006 (2013.01); H04R 9/043 (2013.01); H04R 29/003 (2013.01); G06T 2207/10056 (2013.01)

(58) Field of Classification Search
CPC .... H04R 29/003; H04R 9/043; G06K 9/4671; G06T 7/0006; G06T 7/001; G06T 2207/10056
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,032,202 A | 2/2000 | Lea et al. |
| 6,256,554 B1 | 7/2001 | DiLorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| 7,130,608 B2 | 10/2006 | Hollstrom et al. |
| 7,130,616 B2 | 10/2006 | Janik |
| 7,143,939 B2 | 12/2006 | Henzerling |

(Continued)

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |

OTHER PUBLICATIONS

"AudioTron Quick Start Guide, Version 1.0", Voyetra Turtle Beach, Inc., Mar. 2001, 24 pages.

(Continued)

*Primary Examiner* — Dave Czekaj
*Assistant Examiner* — Berteau Joisil

(57) ABSTRACT

A digital image of a speaker spider may be received from an optical microscope or laser microscope. The digital image is filtered to fill in voids in the digital image, where the voids are indicative of holes in the speaker spider. The filtered digital image is compared to design criteria. An indication on a display screen may indicate whether the fabricated speaker spider meets the design criteria.

17 Claims, 10 Drawing Sheets

(56) References Cited

U.S. PATENT DOCUMENTS

| | | |
|---|---|---|
| 7,236,773 B2 | 6/2007 | Thomas |
| 7,295,548 B2 | 11/2007 | Blank et al. |
| 7,483,538 B2 | 1/2009 | McCarty et al. |
| 7,571,014 B1 | 8/2009 | Lambourne et al. |
| 7,630,501 B2 | 12/2009 | Blank et al. |
| 7,643,894 B2 | 1/2010 | Braithwaite et al. |
| 7,657,910 B1 | 2/2010 | McAulay et al. |
| 7,853,341 B2 | 12/2010 | McCarty et al. |
| 7,987,294 B2 | 7/2011 | Bryce et al. |
| 8,014,423 B2 | 9/2011 | Thaler et al. |
| 8,045,952 B2 | 10/2011 | Qureshey et al. |
| 8,103,009 B2 | 1/2012 | McCarty et al. |
| 8,234,395 B2 | 7/2012 | Millington et al. |
| 8,483,853 B1 | 7/2013 | Lambourne |
| 9,384,519 B1* | 7/2016 | Tripp .................. G06F 16/907 |
| 9,736,449 B1* | 8/2017 | Fan ..................... H04N 13/128 |
| 9,743,194 B1* | 8/2017 | MacLean ............ H04R 31/006 |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0124097 A1 | 9/2002 | Isely et al. |
| 2003/0157951 A1 | 8/2003 | Hasty |
| 2004/0024478 A1 | 2/2004 | Hans et al. |
| 2007/0142944 A1 | 6/2007 | Goldberg et al. |
| 2011/0069860 A1* | 3/2011 | Liu ....................... B82Y 30/00 381/413 |
| 2016/0318256 A1* | 11/2016 | Alkhatib ................ G06T 17/00 |

OTHER PUBLICATIONS

"AudioTron Reference Manual, Version 3.0", Voyetra Turtle Beach, Inc., May 2002, 70 pages.

"AudioTron Setup Guide, Version 3.0", Voyetra Turtle Beach, Inc., May 2002, 38 pages.

Bluetooth. "Specification of the Bluetooth System: The ad hoc Scatternet for affordable and highly functional wireless connectivity," Core, Version 1.0 A, Jul. 26, 1999, 1068 pages.

Bluetooth. "Specification of the Bluetooth System: Wireless connections made easy," Core, Version 1.0 B, Dec. 1, 1999, 1076 pages.

Dell, Inc. "Dell Digital Audio Receiver: Reference Guide," Jun. 2000, 70 pages.

Dell, Inc. "Start Here," Jun. 2000, 2 pages.

Jo et al., "Synchronized One-to-many Media Streaming with Adaptive Playout Control," Proceedings of SPIE, 2002, pp. 71-82, vol. 4861.

Jones, Stephen, "Dell Digital Audio Receiver: Digital upgrade for your analog stereo" Analog Stereo Jun. 24, 2000 retrieved Jun. 18, 2014, 2 pages.

"Denon 2003-2004 Product Catalog," Denon, 2003-2004, 44 pages.

Louderback, Jim, "Affordable Audio Receiver Furnishes Homes With MP3," TechTV Vault. Jun. 28, 2000 retrieved Jul. 10, 2014, 2 pages.

Palm, Inc., "Handbook for the Palm VII Handheld," May 2000, 311 pages.

Presentations at WinHEC 2000, May 2000, 138 pages.

UPnP; "Universal Plug and Play Device Architecture," Jun. 8, 2000; version 1.0; Microsoft Corporation; pp. 1-54.

United States Patent and Trademark Office, U.S. Appl. No. 60/490,768, filed on Jul. 28, 2003, entitled "Method for synchronizing audio playback between multiple networked devices," 13 pages.

United States Patent and Trademark Office, U.S. Appl. No. 60/825,407, filed on Sep. 12, 2003, entitled "Controlling and manipulating groupings in a multi-zone music or media system," 82 pages.

Yamaha DME 64 Owner's Manual; copyright 2004, 80 pages.

Yamaha DME Designer 3.5 setup manual guide; copyright 2004, 16 pages.

Yamaha DME Designer 3.5 User Manual; Copyright 2004, 507 pages.

\* cited by examiner

**SPEAKER
SPIDER
FAILED**

Model of Speaker
Spider: SONOS

Reason for
Failure:

Radius
Correlation
Value 30

Radius
Threshold
Level: 10

Total Units
Tested: 1600

Units Failed 3

SPEAKER SPIDER MEASUREMENT TECHNIQUE

FIELD OF THE DISCLOSURE

The disclosure is related to consumer goods and, more particularly, to methods, systems, products, features, services, and other elements directed to media playback or some aspect thereof.

BACKGROUND

A "speaker spider" is an acoustic component of a loudspeaker. The speaker spider helps maintain a concentric position of a voice coil relative to a magnetic assembly of the loudspeaker when the loudspeaker plays audio content. The speaker spider is typically designed to handle large stresses associated with the loudspeaker playing audio content. In this regard, the speaker spider is fabricated in accordance with design criteria so as to insure that the loudspeaker performs properly.

BRIEF DESCRIPTION OF THE DRAWINGS

Features, aspects, and advantages of the presently disclosed technology may be better understood with regard to the following description, appended claims, and accompanying drawings where:

FIG. 9 shows an example graphical user interface associated with determining whether a fabricated speaker spider meets design criteria.

Figure 1A:
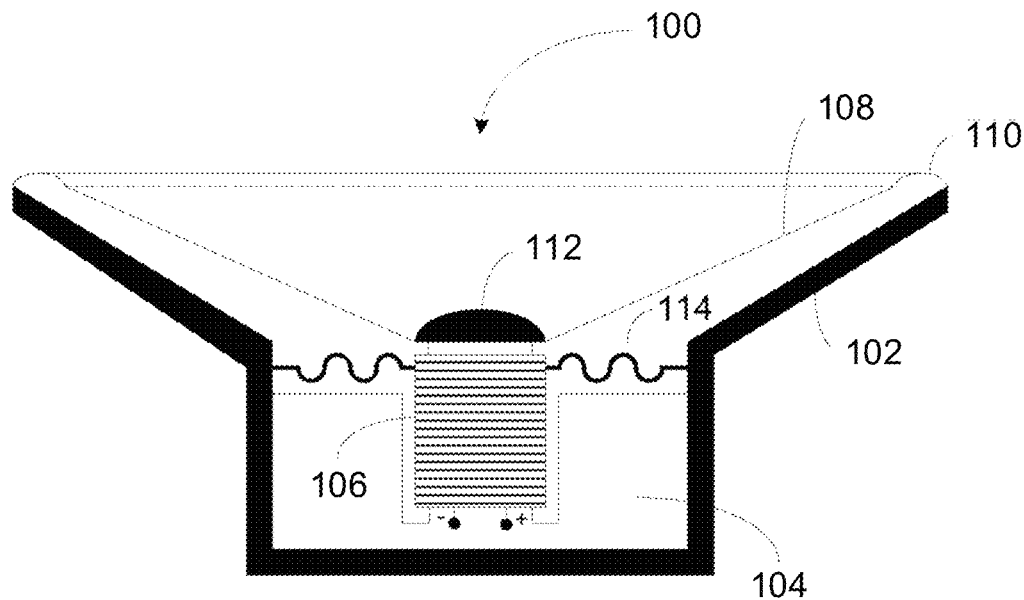
FIGS. 1A-1C show cross-sectional views of examples of transducer apparatuses according to aspects described herein.

The drawings are for the purpose of illustrating example embodiments, but it is understood that the inventions are not limited to the arrangements and instrumentality shown in the drawings.

DETAILED DESCRIPTION

I. Overview

A speaker spider may be fabricated based on design criteria. The design criteria may specify dimensions of the speaker spider and a surface profile of the speaker spider, among other features.

Errors and/or other variations in fabrication of the speaker spider may result in the speaker spider not meeting the design criteria. The errors and/or other variations may impact a longevity of the speaker spider in a loudspeaker and/or cause the audio output by the loudspeaker to be distorted. Typically, a surface of the speaker spider is contact probed to determine whether a fabricated speaker spider meets the design criteria. Contact probing involves physically contacting the speaker spider with a measuring instrument (e.g., radius gauge, caliper) to determine certain characteristics of the speaker spider such as an inner and outer diameter of the speaker spider and height of peaks on a surface of the speaker spider. Results of the contact probing may be compared to the corresponding design criteria associated with the fabricated speaker spider. If the results meet the corresponding design criteria, then the speaker spider may have been fabricated correctly. If the results do not meet the corresponding design criteria, then the speaker spider might not have been fabricated correctly. As a result, the speaker spider may not perform as designed.

Contact probing does not allow for definitively determining whether a fabricated speaker spider meets the design criteria. For example, contact probing requires contact with the speaker spider which, in turn, distorts the speaker spider making accurate measurements difficult. For example, a resolution of contact probing does not permit measuring depths of troughs of the speaker spider and/or determining a shape of the peaks and troughs, e.g., whether sinusoidal or triangular. Such measurements may also be important to determining whether the speaker spider meets the design criteria.

Disclosed herein is a method and system for determining whether a fabricated speaker spider meets design criteria without the drawbacks of contact probing.

An imaging system may determine a digital image of the speaker spider in a non-contact manner. The imaging system may have a light source, system of lenses, and a sensor array. The light source may generate focused (e.g., laser) or unfocused light which is directed toward the speaker spider. The light from the light source may reflect and/or refract off the speaker spider. The system of lenses may receive the reflected and/or refracted light, magnify, and direct the light to the sensor array. The sensor array may receive the light and generate the digital image.

The digital image may take the form of a plurality of pixels. Each pixel may be associated with a grayscale value and/or a color value. The grayscale value may be indicative of a range of gray shades from white to black. The color value may be one or more of a red, green, and blue value that is used to define a color of the pixel.

The speaker spider may be formed by weaving a textile such as cotton, poly cotton, or nomex material, in accordance with a weave pattern. The weave pattern used to form the speaker spider may result in a surface of the speaker spider having holes. The holes may be spaces in between threads of the textile that are woven to form the speaker spider. The holes in the speaker spider may show up in the digital image as voids. The digital image may be processed by an image processing system to detect and fill in the voids in the digital image. For example, the image processing system may process the digital image to detect pixels which have a grayscale value or color value that is less than a predetermined threshold. The pixels less than the threshold amount may be indicative of the voids in the digital image. The voids in the digital image may be filled in by applying a filter such as an interpolation filter to the pixels associated with the voids.

In some instances, the image of the speaker spider may be pre-processed to facilitate detecting and filling in the voids. The pre-processing might involve applying a filter across the digital image such as a global contrast enhancement filter and/or a global edge detection filter. Then the pre-processed image may be processed to detect and fill in the voids.

The filtered digital image of the fabricated speaker spider may be compared to design criteria associated with the fabricated speaker spider. The design criteria may take the form of a reference drawing of the speaker spider. The reference drawing may be, for example, a computer-aided design (CAD) file representative of dimensions and/or a surface profile of how the speaker spider should be fabricated. Alternatively, the design criteria may be numerical parameters indicative of the dimensions of the speaker spider and/or surface profile of the speaker spider. Dimensions of the fabricated speaker spider and/or a surface profile of the fabricated speaker spider may be determined from the digital image of the fabricated speaker spider and compared to the dimensions and/or a surface profile of the speaker spider defined by the design criteria. A correlation may be determined between the compared dimensions and/or the surface profile. For example, the correlation may be a difference between the compared dimensions and/or the surface profile.

The correlation may indicate whether the speaker spider was fabricated properly. For instances, the correlation may be compared to a threshold level. If the correlation is above the threshold level, then the speaker spider might not be properly fabricated. If the correlation is below the threshold level, then the speaker spider may be properly fabricated. A correlation may be determined for each speaker spider that is manufactured and/or a correlation may be determined for a sampling of the speaker spiders that are manufactured. Whether the correlation is above or below the threshold level may indicate whether there are problems in manufacture of the speaker spider.

Moving on from the above illustration, an example embodiment includes a system comprising a processor; memory; and computer instructions stored in the memory and executable by the processor to cause the processor to: receive a digital image of a fabricated speaker spider; filter the digital image to fill in voids in the digital image, wherein the voids in the digital image are indicative of holes in the fabricated speaker spider; determine a feature of the fabricated speaker spider based on the filtered digital image; compare the feature to corresponding design criteria associated with the fabricated speaker spider; and output an indication of whether the fabricated speaker spider meets the design criteria. Receiving the digital image of the fabricated speaker may comprise receiving the digital image from an optical microscope. The system may further comprise computer instructions for detecting the voids within the digital image of the fabricated speaker spider before filtering the digital image. The digital image may comprise a plurality of pixels. Detecting voids within the digital image may comprise comparing a value of a pixel to a predetermined threshold. The computer instructions for filtering the digital image may comprise filtering pixels associated with the voids based on an interpolation filter. The design criteria may be defined by a reference drawing associated with the fabricated speaker spider. The fabricated speaker spider may be formed from a woven textile material. Outputting an indication whether the fabricated speaker spider meets the design criteria may comprise displaying the indication on a display screen of a client station. The fabricated speaker spider may be a component of a loudspeaker. The feature may be defined by a surface profile of the fabricated speaker spider.

Another example embodiment includes a method comprising: receiving a digital image of a fabricated speaker spider; filtering the digital image to fill in voids in the digital image, wherein the voids in the digital image are indicative of holes in the fabricated speaker spider; determining a feature of the fabricated speaker spider based on the filtered digital image; comparing the feature to corresponding design criteria associated with the fabricated speaker spider; and outputting an indication of whether the fabricated speaker spider meets the design criteria. Receiving the digital image of the fabricated speaker may comprise receiving the digital image from a non-contact imaging system. The method may further comprise detecting the voids within the digital image of the fabricated speaker spider before filtering the digital image. The digital image may comprise a plurality of pixels. Detecting voids within the digital image may comprise comparing a value of a pixel to a predetermined threshold. Filtering the digital image may comprise filtering pixels associated with the voids based on an interpolation filter. The design criteria may be defined by a reference drawing of the speaker spider. Comparing the feature to a corresponding design criteria associated with the fabricated speaker spider may comprise comparing a dimension of the fabricated speaker spider to a corresponding dimension defined by the design criteria. Outputting an indication of whether the fabricated speaker spider meets the design criteria may comprise displaying the indication on a display screen of a client station. The fabricated speaker spider may be a component of a loudspeaker.

Still another example embodiment includes a tangible non-transitory computer readable storage medium including instructions for execution by a processor, the instructions, when executed, cause the processor to implement a method comprising: receiving a digital image of a fabricated speaker spider; filtering the digital image to fill in voids in the digital image, wherein the voids in the digital image are indicative of holes in the fabricated speaker spider; determining a feature of the fabricated speaker spider based on the filtered digital image; comparing the feature to corresponding design criteria associated with the fabricated speaker spider; and outputting an indication of whether the fabricated speaker spider meets the design criteria.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Loudspeaker Devices

Figure 1B:
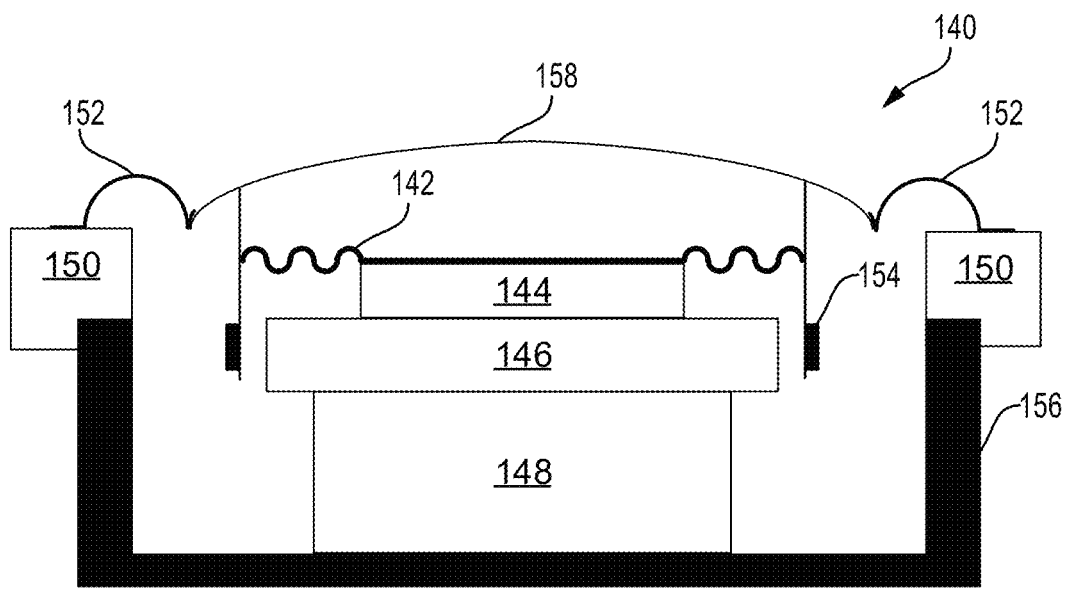
Figure 1C:
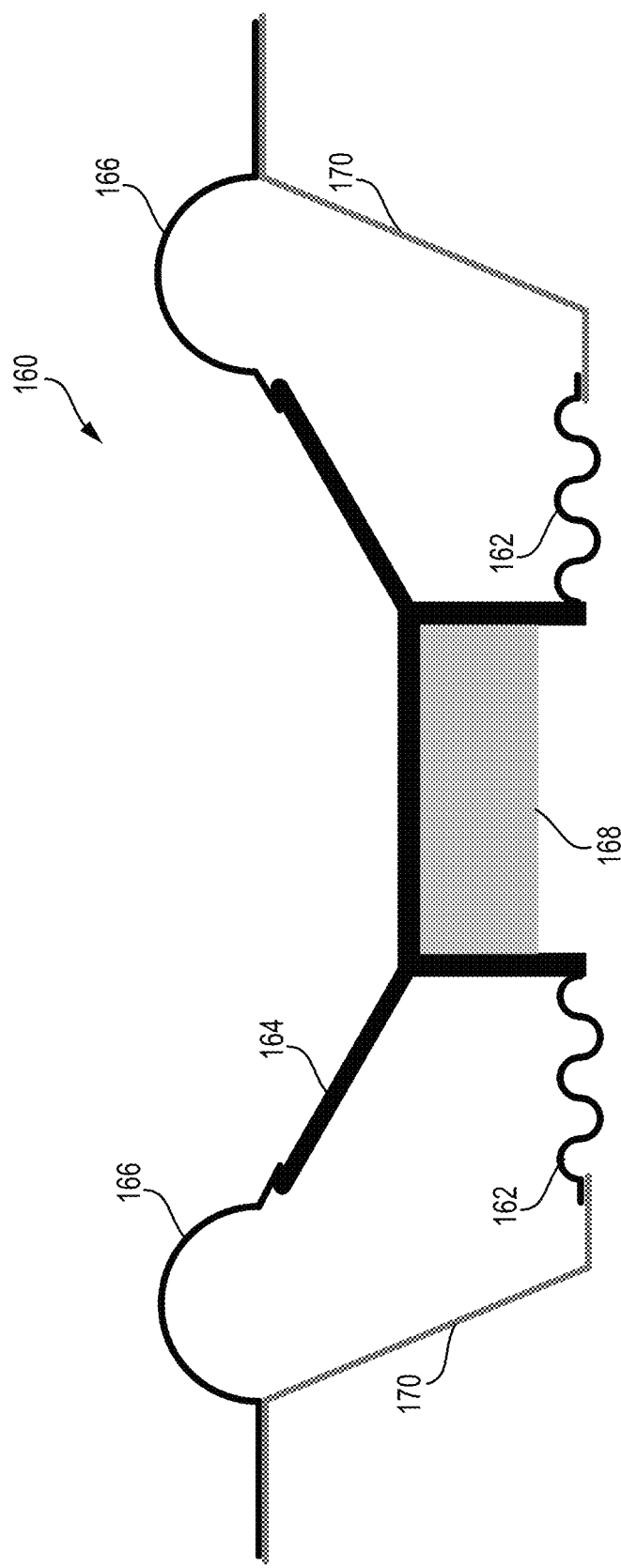

FIGS. 1A, 1B, and 1C show illustrative examples of various loudspeakers 100, 140, 160 and acoustic components that make up the loudspeakers. Each of the illustrative examples utilize a speaker spider to facilitate output of sound by the loudspeaker.

FIG. 1A shows a cross-sectional view of an example loudspeaker 100. The loudspeaker 100 may include a speaker frame (or "basket") 102 and a magnetic structure 104 having a central portion. A voice coil 106 may be mechanically suspended about the center portion of the magnetic structure 104 by coupling voice coil 106 to a speaker cone 108 that is further coupled to the speaker frame 102 via a surround 110. The voice coil 106, as shown, may have a positive and negative terminal through which electric signals may be provided to drive the voice coil along the center portion of the magnetic structure 104. Movement of the speaker cone 108 when the voice coil 106 is driven causes sound to be produced. A dust cap 112 may cover the voice coil 106 to protect the voice coil 106 from external debris. The loudspeaker 100 may include a speaker spider 114 coupling the speaker frame 102 to the voice coil 106. The speaker spider 114 may have a plurality of concentric corrugations that provide a spring-like mechanism to allow movement of the voice coil 106 relative to the speaker frame 102 when the voice coil 106 is driven during operation, while maintaining a concentric position of the voice coil 106 relative to a magnetic assembly of the loudspeaker. In other words, the speaker spider 114 can act as a spring (with an associated stiffness versus displacement), providing a restoring force on the cone 108 and voice coil 116 to ensure these parts do not move inward or outward farther than intended.

FIG. 1B shows a cross-sectional view of another example of a loudspeaker 140.

Loudspeaker 140 may include a speaker spider 142, a spacer 144, a steel washer 146, a magnet 148, a carrier 150, a surround 152, a voice coil 154, a steel cup 156, and a diaphragm or speaker cone 158. Examples of types of loudspeakers that may use this arrangement of components include a mid-range speaker and a woofer, among others.

In this case, speaker spider 142 may be disposed within voice coil 154. Further, the speaker spider 142 might not have a central opening and may be attached on one side at the center to a first side of a spacer or magnet 144. The outer dimension or perimeter of speaker spider 142 may be coupled to the inner side of voice coil 154. Spacer 144 may be attached to a washer 146 (e.g., steel washer) on a second side opposing the first side of spacer 144. For example, spacer 144 may be attached to speaker spider 142 and/or washer 146 using an attachment mechanism (e.g., glue). Spacer 144 may be immobile such that movement of voice coil 154 causes displacement of the outer dimension or perimeter of speaker spider 142 relative to the center of speaker spider 142. One end of voice coil 154 can be attached to diaphragm 158, and surround 152 may be attached between diaphragm 158 and carrier 150. Speaker spider 142, spacer 144, washer 146, and magnet 148 may be stacked within a steel cup 156. Carrier 150 may be placed on top of steel cup 156 between surround 152 and steel cup 156.

FIG. 1C shows a cross-sectional view of yet another example of a loudspeaker 160. Loudspeaker 160 includes a speaker spider 162, diaphragm or cone 164, surround or suspension 166, suspended mass 168, and frame or basket 170. Speaker spider 162 may be attached at the center in the central opening to a diaphragm 164 containing a hanging mass or weight 168 which is suspended from the center of the diaphragm 164, and the hanging mass or weight 168 may be placed within a frame or container of diaphragm 164 on the side within frame 170. In some aspects, speaker spider 162 may be connected directly to hanging mass or weight 168 which is suspended from the center of diaphragm 164. The outer perimeter or edge of speaker spider 162 may be attached to frame 170.

III. Example Designs of Speaker Spiders

The speaker spider may be formed from a textile material that may include one or more of a cotton, poly cotton, or nomex material, among other possibilities. U.S. patent application Ser. No. 15/018,785 filed Feb. 8, 2016 and entitled "Woven Transducer Apparatus" and U.S. patent application Ser. No. 14/448,942 filed Jul. 31, 2014 and entitled "Apparatus Having Varying Geometry", the contents each of which is herein incorporated by reference in its entirety, describes various methods for forming a speaker spider.

Figure 2:
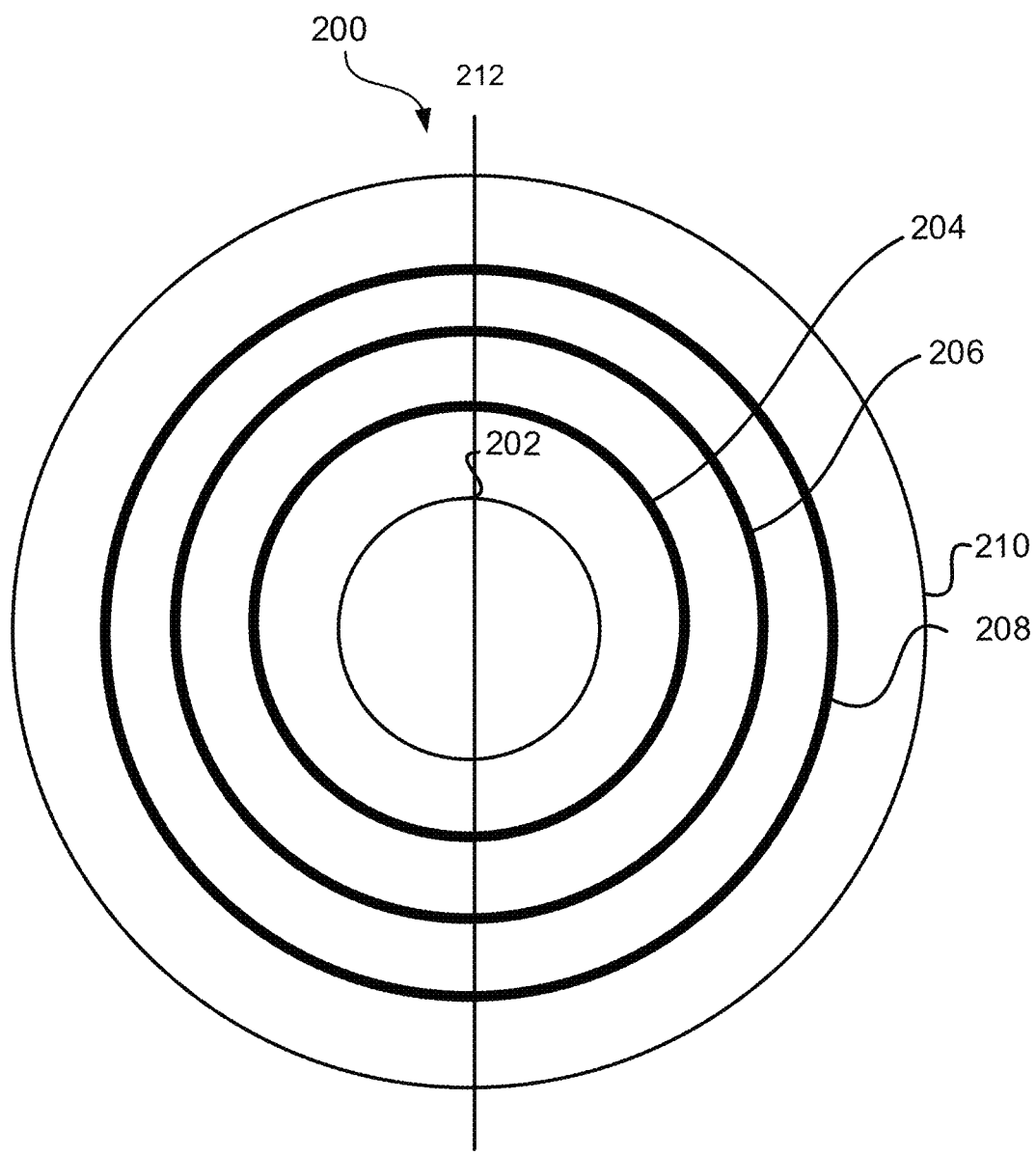
FIG. 2 shows an example of a speaker spider design.

FIG. 2 shows an example speaker spider design 200. The speaker spider design 200 may have a central opening 202, corrugations 204, 206, 208, and an outer portion 210. Speaker spider design 200 is shown with a central opening in which a voice coil may be placed, but depending on a configuration the speaker spider might not have a central opening. The corrugations 204, 206, and 208 may be raised or lowered regions of the speaker spider. Further, the raised regions may include peaks and the lowered regions may include troughs of the speaker spider. The corrugations 204, 206, 208 may provide a spring-like mechanism to allow movement of the voice coil relative to the loudspeaker frame during operation, while also maintaining a concentric position of a voice coil relative to a magnetic assembly of the loudspeaker.

Figure 3:
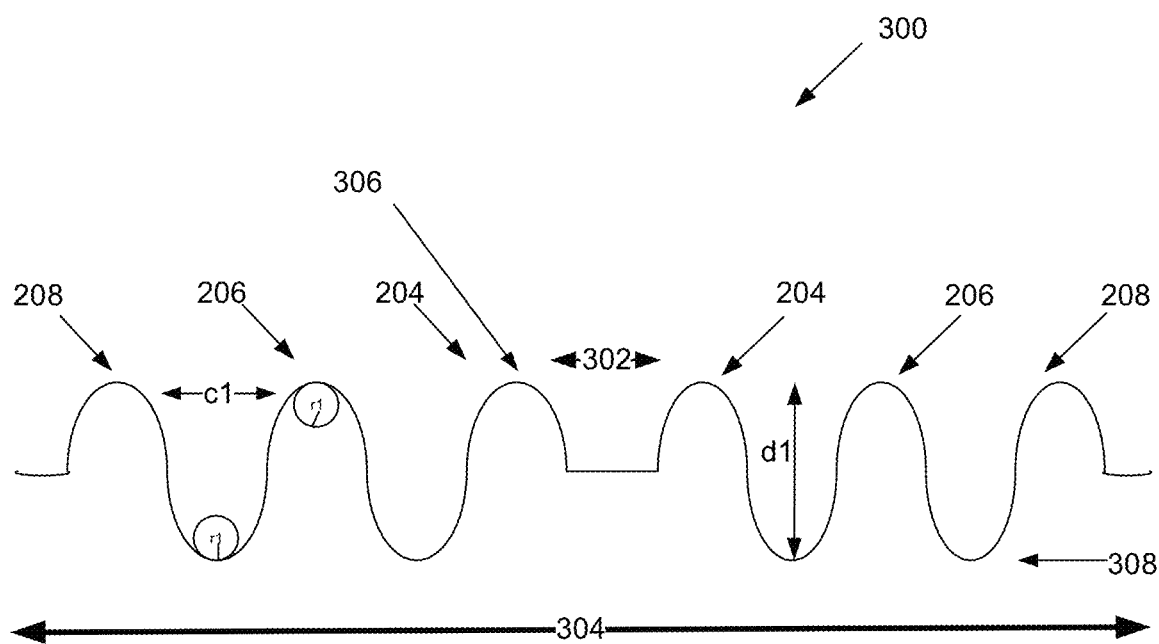
FIG. 3 shows an example of a surface profile of a speaker spider design.

FIG. 3 shows a surface profile 300 of the example speaker spider design 200. The surface profile 300 highlights the speaker spider corrugations 204, 206, and 208 at cross section 212 shown in FIG. 2. As shown, the speaker spider design 200 may have an inner diameter 302 associated with the central opening 202 of the example speaker spider design 200 and an outer diameter 304 associated with the outer portion 210 of the example speaker spider design. Further, each of the corrugations 204, 206, and 208 may have one or more peaks and/or one or more troughs. Still further, each corrugation may be separated by another corrugation by a spatial distance c1. The spatial distances may be the same between corrugations or different between corrugations.

In the example of FIG. 3, a peak and trough is shown by 306 and 308 respectively. A depth of corrugation 206 is shown as d1. In one case, the corrugations 204, 206, and 208 may have the same depth. For instance, the corrugations 204, 206, and 208 may have depths of d1. In another case, the corrugations 204, 206, and 208 may each have different depths. For instance, the corrugation 208 may have a depth greater than the depth d1 of corrugation 206, and the corrugation 204 may have a depth less than the depth d1 of the corrugation 206. Other variations are also possible.

Each peak and trough of the corrugations 204, 206, and 208 may also have a respective curvature. For instance, the peak of the corrugation 206 has a curvature with radius r1 shown by the circle with radius r1. In one case, the peak curvature and the trough curvature of a corrugation may be the same. For instance, the trough of the corrugation 206 may also have a curvature with radius r1 shown by the circle r1 with radius r1, the same as the curvature of the peak. In another case, the trough curvature of a corrugation may have a radius bigger or smaller than the peak curvature of the corrugation. For instance, the trough curvature of the corrugation 206 may have a radius that is bigger or smaller than the radius r1 of the peak curvature. Other variations are also possible.

The speaker spider shown in FIGS. 2 and 3 may take other forms as well. In some embodiments, the corrugations may have a depth based on an azimuthal position of a corrugation relative to the central opening 302 of the speaker spider. In some embodiments, the speaker spider may have more or less than three corrugations. In some embodiments, a curvature of the peak and trough may not be rounded. Still other variations are also possible.

Figure 4:
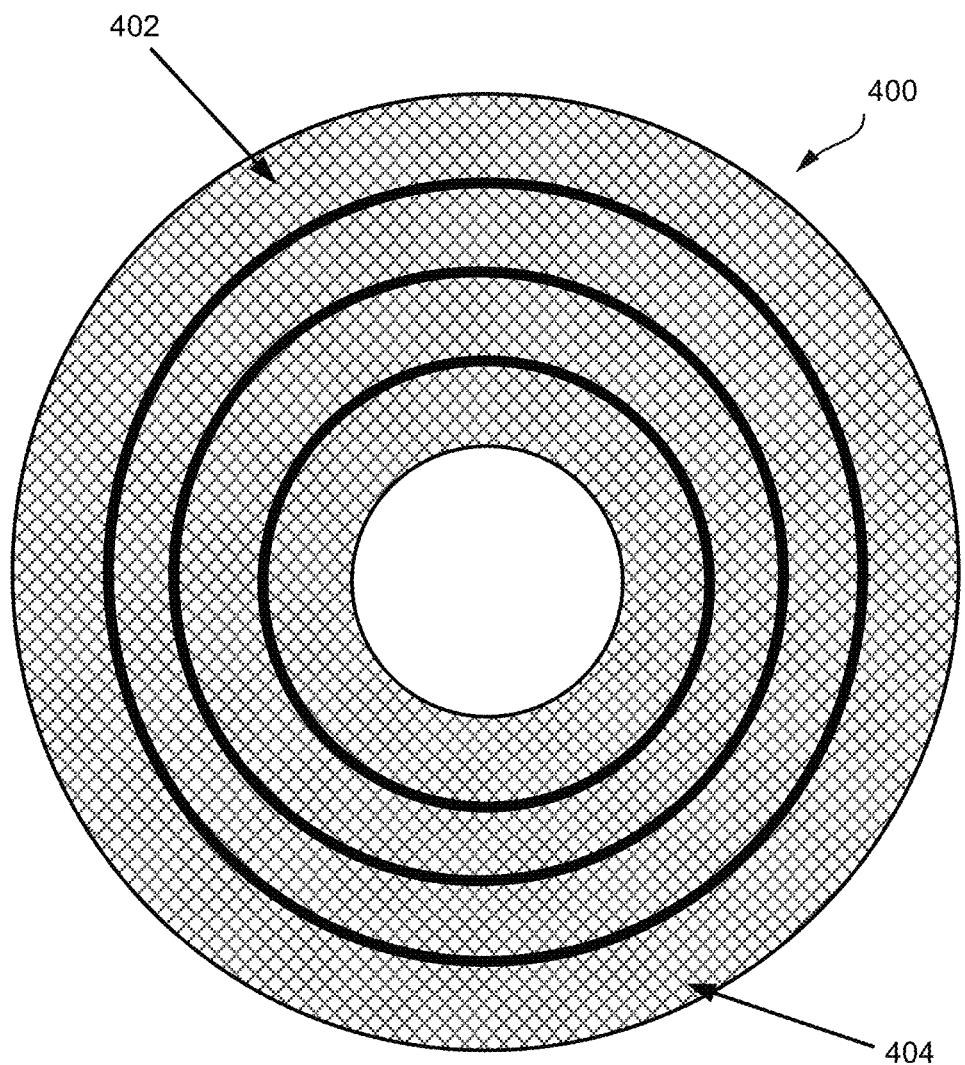
FIG. 4 shows an example of a fabricated speaker spider.

FIG. 4 shows an example of a fabricated speaker spider 400. The fabricated speaker spider 400 shows that the speaker spider is formed by weaving threads 402 of the textile material in accordance with a weave pattern. The corrugations in turn may be formed by applying a stiffening agent to the woven textile material. The example weave pattern shown in FIG. 4 consists of a concentric and radial weaves spanning between the inner and outer diameter. The weave pattern may form holes 404 in the fabricated speaker spider. The holes 404 may be spaces between woven threads of the textile material, e.g., a grid pattern. The presence and amount of holes in the fabricated speaker spider may depend on a type of the textile material used to fabricate the speaker spider, a thickness of the textile material, a weave pattern used to fabricate the speaker spider, and/or machinery used to fabricate the speaker spider. The holes may be present on edges of the fabricated speaker spider, within the fabricated speaker spider, near corrugations of the fabricated speaker spider, at or near troughs of the fabricated speaker spider, at or near peaks of the fabricated speaker spider, among other places.

Proper fabrication of the speaker spider enables the speaker spider to disperse stress evenly. If the speaker spider is not fabricated properly, then high stress areas may form in the speaker spider. The high stress areas may result in an increased chance of cracking or tearing, and may be points of failure that compromise the longevity of the speaker spider or the performance of the speaker spider.

Improper fabrication of a speaker spider may also manifest in a buckling or off-axis motion. The buckling motion in speaker spiders may appear when displacement of the speaker spider reaches a threshold where the voice coil to which the speaker spider is attached is displaced causing the fabric to quickly and suddenly distort in trying to relieve the internal stresses. The off-axis motion can occur when a buckling motion happens in a non-concentric or non-time aligned way. For example, if one side of the speaker spider manifests the creases but the other side of the speaker spider has not yet manifested creases at that given displacement, then the stiffness of the fabricated speaker spider is no longer axisymmetric. This lack of axis symmetry can cause the voice coil to move up and down with a side-to-side motion. If the voice coil comes in contact with other components of the loudspeaker while in motion, an objectionable rubbing or buzzing sound may be heard.

Disclosed herein are embodiments for determining whether a fabricated speaker spider meets design criteria. The design criteria may define dimension and/or surface profile of a properly fabricated speaker spider. The fabricated speaker spider should meet the design criteria, but due to various reasons, e.g., manufacturing problems, defects in the textile material, the fabricated speaker spider might not meet the design criteria. The dimensions of a fabricated speaker spider might not meet the dimensions specified by the design criteria. For example, the inner and/or outer diameter may be too small or too big. The surface profile of the fabricated speaker spider might not meet the surface profile specified by the design criteria. For example, a depth of a corrugation may be too high or too low. For example, the peak or trough may not have a certain radius of curvature. Failure to identify that the fabricated speaker spider does not meet the design criteria may impact longevity of the speaker spider and loudspeaker which uses the speaker spider and/or the performance of the speaker spider such as causing the loudspeaker to output distorted audio.

Figure 5:
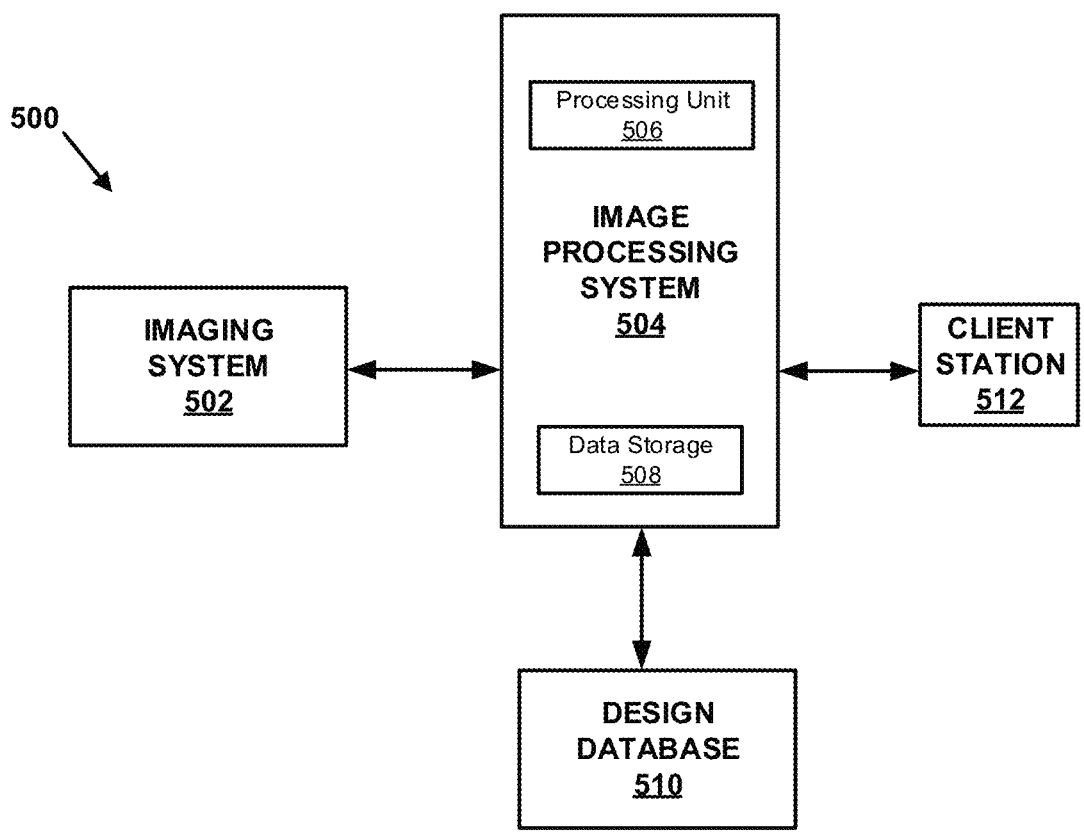
FIG. 5 shows an example system for determining whether a fabricated speaker spider meets design criteria.

FIG. 5 is a simplified block diagram of a system 500 for determining whether speaker spider meets design criteria. It should be understood that this and other arrangements described herein are set forth only as examples. Those skilled in the art will appreciate that other arrangements and elements (e.g., networks, systems, devices, interfaces, functions, orders, and groupings of functions, etc.) can be used instead, some elements may be added, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions written in any suitable programming language and stored on a non-transitory computer-readable media.

The system 500 may include an imaging system 502, an image processing system 504, a design database 510, and a client station 512. The imaging system 502, design database 510, and a client station 512 may be communicatively coupled together to the image processing system 504, via a wired, wireless, and/or network connection.

The imaging system 502 may be arranged to generate a digital image of the fabricated speaker spider. The imaging system may have a light source, system of lenses, and a sensor array to generate the digital image in a non-contact manner. The light source may generate light directed toward the speaker spider. The light may be reflected and/or refracted light off the fabricated speaker spider and in some embodiments, off a fixed backplane behind the fabricated speaker spider. The system of lenses may receive the reflected and/or refracted light, magnify and direct the light to the sensor array. The sensor array may receive the light and generate the digital image. The sensor array may have a plurality of sensors such as a charge coupled device (e.g., a complementary metal-oxide-semiconductor (CMOS) sensor), for forming the digital image.

In one embodiment, the imaging system 502 may take the form of an optical microscope. The optical microscope may use unfocused light to generate the digital image. In another embodiment, the imaging system 502 may take the form of a scanning microscope. The scanning microscope may use focused light, e.g., a laser, to generate the digital image.

The digital image of the speaker spider may take the form of an array of pixels. Each pixel may be associated with a grayscale value and/or a color value.

The grayscale value may be indicative of a range of gray shades from white to black. Typically, the grayscale value may be an 8-bit or 16-bit value. If the grayscale value is zero, then the pixel may be black. If the grayscale value is 255, then the pixel may be white. If the grayscale value is between 0 and 255, then the pixel may take the form of a gray value.

The color value may be one or more of a red, green, and blue values that is used to define a color of the pixel. The red, green, and blue values may each be represented as 8 bits. When a red value is to set to zero, then the red color is off, and when the red value is set to 255, the red value is fully on. When a green value is to set to zero, then the green color is off, and when the green value is set to 255, the green value is fully on. When a blue value is to set to zero, then the blue color is off, and when the blue value is set to 255, the blue value is fully on. Any value in between results in a partial emission.

The image processing system 504 may receive and process the digital image of the fabricated speaker spider to determine whether the fabricated speaker spider meets design criteria. The imaging system may have a processing unit 506 and data storage 508.

The processing unit 506 may comprise one or more processor components, such as general-purpose processors (e.g., a single-core or multi-core microprocessor), special-purpose processors (e.g., an application-specific integrated circuit or digital-signal processor), programmable-logic devices (e.g., a field programmable gate array), and/or any other processor components now known or later developed. The processing unit 506 may execute computer instructions for performing one or more functions disclosed herein associated with determining whether a fabricated speaker spider meets design criteria.

The data storage 508 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, and/or an optical-storage device). The data storage 508 may store computer instructions executable by the processing unit 506 for performing the one or more functions disclosed herein associated with determining whether a fabricated speaker spider meets design criteria.

The design database 510 may define design criteria associated with a speaker spider. The design criteria may take the form of a reference drawing of the speaker spider. The reference drawing may define a graphical representation of the speaker spider design. The reference drawing may be, for example, a CAD file, bitmap file, or JPEG file. The reference drawing may describe dimensions of the speaker spider. The dimensions may take the form of an inner diameter dimension and an outer diameter dimension and/or a spatial distance between corrugations (e.g., between peaks and troughs) etc. In addition, or alternatively, the reference drawing may describe a surface profile of the speaker spider. The surface profile may define a curvature radius of a corrugation, a curvature radius of a peak, a curvature radius of a trough, spatial distance between peaks, spatial distance between troughs, and/or spatial distance between a peak and a trough, depth of a corrugation. The dimensions and/or surface profile may be shown in the reference drawing itself and/or stored in the design database, for example, as metadata associated with the reference drawing. Other arrangements are also possible.

In some instances, the design criteria may take the form of numerical parameters indicative of the dimensions (e.g., inner diameter dimension and an outer diameter dimension and/or a spatial distance between corrugations etc.) and/or a surface profile (e.g., a curvature radius of a corrugation, a curvature radius of a peak, a curvature radius of a trough, spatial distance between peaks, spatial distance between troughs, and/or spatial distance between a peak and a trough, depth of a corrugation) of the properly fabricated speaker. The design criteria may be stored in the design database 510 in the form of a table or other data structure.

In some instances, the design database 510 may also function as a computer-aided design system. In other instances, the image processing system 504 and the design database 510 may collectively function as a computer-aided design system.

The representative client station 512 may be any computing device having hardware components and software components that enable interaction with the image processing system 504. For instance, the client station's hardware components may include a display screen, user-input such as a keyboard, a communication interface, a processor, data storage, among others. For instance, the client station's software components may include a native client application associated with the image processing system 504 or a web browser that is capable of accessing a web application associated with the image processing system 504, among others. Examples of the client station 512 may include a desktop computer, a laptop, a netbook, a tablet, a smart-phone, a personal digital assistant (PDA), or any other such device now known or later developed. Accordingly, the client station 512 may enable remote access to functions provided by the image processing system 504.

IV. Example Method

Figure 6:
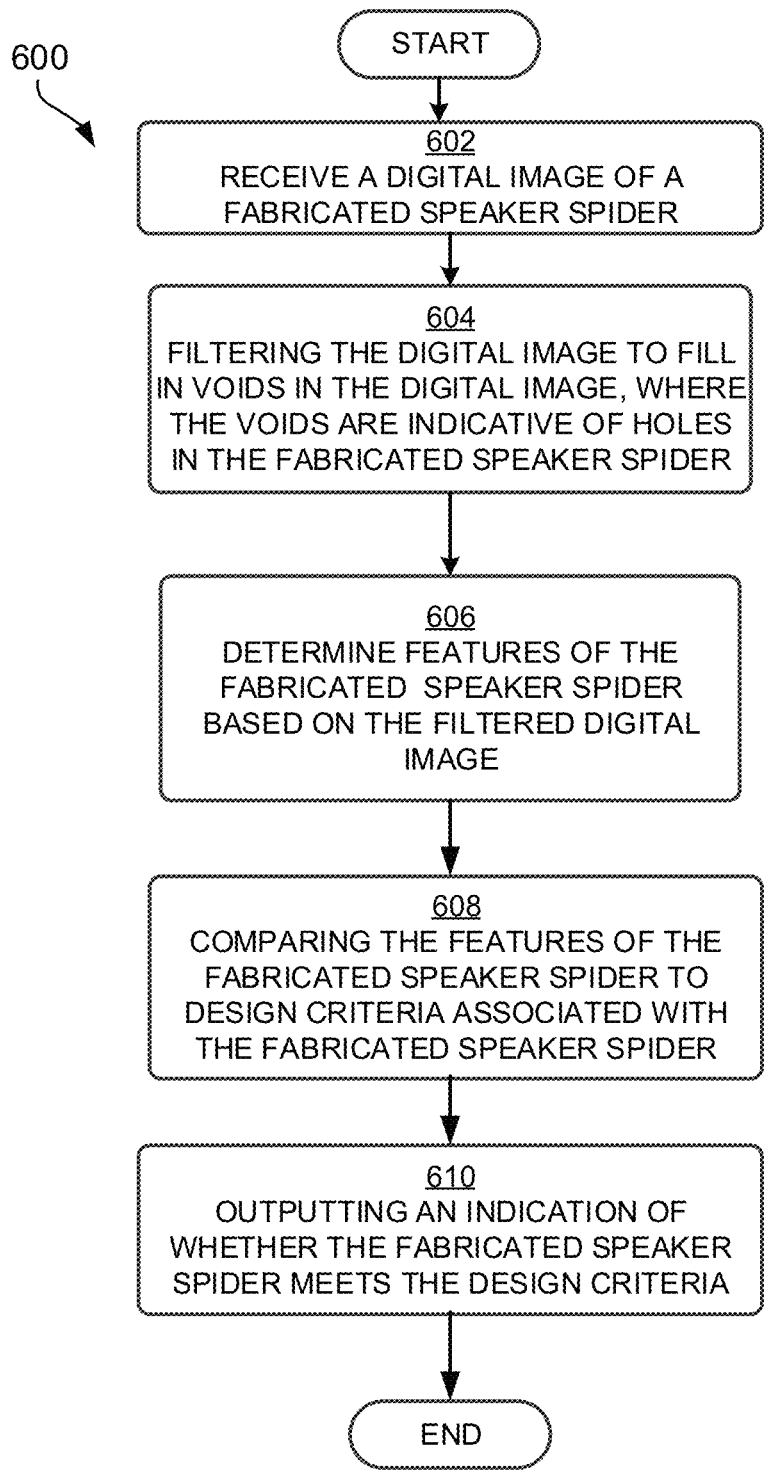
FIG. 6 shows an example flow chart of functions associated with determining whether a fabricated speaker spider meets design criteria.

FIG. 6 shows a flowchart of an example method 600 for determining whether a fabricated speaker spider meets design criteria.

The flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of tangible computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

Briefly, at 602, the image processing system 504 may receive a digital image of a fabricated speaker spider. The speaker spider may be fabricated via a manufacturing process based on design criteria. The design criteria may specify one or more of dimensions, e.g., inner diameter, outer diameter, of the fabricated speaker spider and/or a surface profile of the fabricated speaker spider. At 604, the image processing system 504 may filter the digital image to fill in voids in the digital image. The voids in the digital image may be indicative of holes in the fabricated speaker spider. At 606, the image processing system 504 may determine features of the fabricated speaker spider based on the filtered digital image. At 608, the image processing system 504 may compare the features of the fabricated speaker spider to the design criteria associated with the fabricated speaker spider. At 610, the image processing system 504 may output an indication of whether the fabricated speaker spider meets the design criteria.

Referring back, at 602, the imaging processing system 504 may receive from the imaging system 502 a digital image of a fabricated speaker spider. The imaging system 502 may form the digital image by directing light onto the surface of the fabricated speaker spider. The light may be unfocused in the case of an optical microscope or focused in the case of a laser microscope. The light may reflect and/or refract off the speaker spider and/or fixed backplane. A system of lenses and mirrors may receive the reflected and/or refracted light, magnify, and direct the reflected and/or refracted light to a sensor array. The sensor array may output a plurality of pixels which represent the digital image of the fabricated speaker spider.

Figure 7:
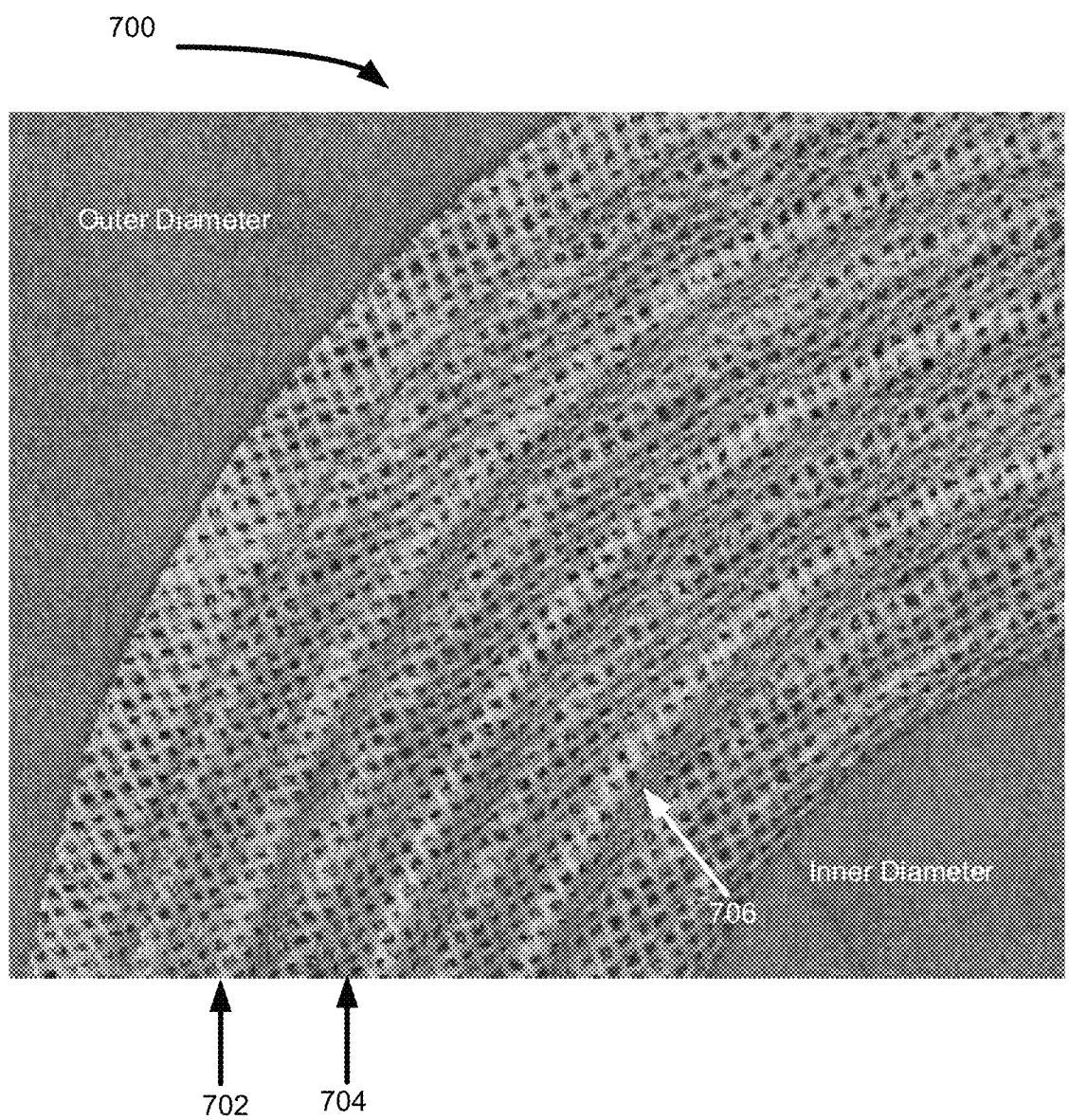
FIG. 7 shows an example digital image of a fabricated speaker spider.

FIG. 7 shows an example of the digital image 700. The digital image 700 illustrates a portion of a fabricated speaker spider along a radial direction from an inner diameter to the outer diameter of the fabricated speaker spider. Each pixel of the digital image may be associated with a spatial location on the fabricated speaker spider. In this regard, more pixels in the digital image 700 may indicate a finer resolution of the fabricated speaker spider. Conversely, less pixels in the digital image 700 may indicate a coarser resolution of the fabricated speaker spider.

Additionally, each pixel of the digital image 700 be associated with a grayscale value and/or a color value.

The grayscale value may be indicative of a range of gray shades from white to black. Typically, the grayscale value may be 8-bit or 16-bit value. If the grayscale value is zero, then the pixel may be black. If the grayscale value is 255, then the pixel may be white. If the grayscale value is between 0 and 255, then the pixel may be take the form of a gray value. Other variations are also possible. For example, if the grayscale value is zero, then the pixel may be white. If the grayscale value is 255, then the pixel may be black.

The color value may be one or more of red, green, and blue values that is used to construct a color of the pixel. The red, green, and blue pixels may be each represented as 8 bits. When a red value is to set to zero, then the red color is off, and when the red value is set to 255, the red value is fully on. Any value in between results in a partial emission. Other variations are also possible. For example, if the color value is zero, then the pixel may have a maximum color. If the color value is 255, then a color associated with the pixel may be off.

The grayscale value or color value of a pixel may correspond to how much light is received by a sensor associated with the pixel. In turn, the amount of light received by a sensor may be indicative of how close a surface of the speaker spider is to the sensor at that pixel location.

For example, if a surface of the fabricated speaker spider is near the sensor, then the light reflected and/or refracted off the speaker spider may be less attenuated than if the surface of the fabricated speaker spider is further from the sensor. Accordingly, the sensor associated with a pixel may receive more light the closer the speaker spider is to the sensor. Conversely, the sensor associated with a pixel may receive less light the further away the speaker spider is to the sensor. The grayscale value and/or color value of a pixel may be indicative of this amount of light.

The amount of light received by the sensor is just an example of what the grayscale value or color value may represent. The grayscale value or color value might correspond to other information such as wavelength of light received, intensity of light received, etc.

The grayscale value and/or color value may scale to a distance. The distance may be based a focal length of the imaging system 502. In this regard, the grayscale and/or color values may facilitate determining dimensions and/or a surface profile of the speaker spider.

In one example depending on a configuration of the imaging system 502, a dark (e.g., gray, black) or cool color pixel (e.g., blue, green) in the digital image may indicate a large distance from the surface of the speaker spider to the sensor and a light (e.g., white) or hot color pixel (e.g., red, orange) may indicate a short distance from the surface of the speaker spider to the sensor. In this regard, a light or hot color pixel could correspond to a peak on a surface of the fabricated speaker spider and a dark or cool color pixel could correspond to a trough on a surface of the fabricated speaker spider or an edge of the outer or inner diameter of the fabricated speaker spider. For example, the light bands 702 in the digital image 700 may indicate peaks on the surface of the fabricated speaker spider. For example, dark bands 704 in the digital image may indicate troughs on the surface of the fabricated speaker spider or where the outer diameter or inner diameter of the fabricated speaker spider ends. Variations in the light and dark regions may indicate surface variations on the speaker spider, e.g., a shape or curvature of a peak and/or trough. The actual pixel value (e.g., grayscale value or color value) may indicate a height of the peak and/or depth of a trough, elevations between a trough and a peak, and/or a shape or curvature of the peak and/or trough etc.

In another example depending on configuration of the imaging system 502, a light (e.g., white) or hot color pixel (e.g., red, orange) in a digital image (not digital image 700) may indicate a large distance from the surface of the speaker spider to the sensor and a dark (e.g., black, gray) or cool color pixel (e.g., blue, green) may indicate a short distance from the surface of the speaker spider to the sensor. In this regard, a dark or cool color pixel could correspond to a peak on a surface of the fabricated speaker spider and a light or hot color pixel could correspond to a trough on a surface of the fabricated speaker spider or an edge of the outer diameter or inner diameter of the fabricated speaker spider. For example, the light bands in the digital image may indicate troughs on the surface of the fabricated speaker spider or where the outer diameter or inner diameter of the fabricated speaker spider ends. For example, dark bands in the digital image may indicate peaks on the surface of the fabricated speaker spider. Variations in the light and dark regions may indicate surface variations on the speaker spider, e.g., a shape of a peak and/or trough. The actual pixel value (e.g., grayscale value or color value) may indicate a height of the peak and/or depth of a trough, elevations between a trough and a peak, and/or a shape or curvature of the peak and/or trough etc.

The digital image 700 may also indicate holes in the fabricated speaker spider. The holes may appear as voids 706 (e.g., dark spots shaped in accordance with the weave pattern) in the digital image 700. The amount of light received by the sensor may be indicative of whether there is a hole on the speaker spider at that pixel location. At a hole, the light may pass through the fabricated speaker spider. Alternatively, at a hole, the light may pass through the fabricated speaker spider, be reflected and/or refracted by the fixed background behind the speaker spider, and then received by the sensor. In either case, the received light may be attenuated such that the amount of light received by the sensor is indicative of a hole at that pixel location.

The image processing system 504 may detect voids in the digital image by comparing a grayscale value or color value of a pixel to a predetermined threshold amount. The predetermined threshold amount may be determined by analyzing the grayscale value or color value for a pixel at a spatial location of a hole in the fabricated speaker spider for a plurality of fabricated speaker spiders. The predetermined threshold amount may be based on an average grayscale value or color value at the spatial location of a hole. If a pixel or group of pixels has a grayscale value or color value that is less than a predetermined threshold, then the pixel or group of pixels may be associated with a void in the digital image caused by a presence of a hole in the fabricated speaker spider. If a pixel or group of pixels has a grayscale value or color value that is greater than a predetermined threshold, then the pixel or group of pixels may not be associated with a void in the digital image caused by a presence of a hole in the fabricated speaker spider.

In some instances, the image of the speaker spider may be pre-processed prior to detecting the voids. The pre-processing might involve applying a filter across the entire image such as a global contrast enhancement filter and/or a global edge detection filter. Then the pre-processed image may be processed to identify the voids.

Referring back to FIG. 5, at 604, the image processing system 504 may filter the digital image to fill in voids in the digital image. The filtering may be performed on color pixel values, grayscale values, color pixels converted to grayscale values, or grayscale values converted to color values. The filtering may prepare the digital image for subsequent extraction of features of the fabricated speaker spider using well-known image processing techniques.

For example, an interpolation filter may be applied to the pixels associated with the void. The interpolation filter may be one dimensional multi-tap filter, such as a 1×3 filter or 1×5 filter, or a two dimensional multi-tap filter, such as a 3×3 filter or a 5×5 filter. The interpolation filter may calculate color or grayscale values for the pixels associated with the void. These calculated values may then replace the color values or grayscale values of the pixels associated with the void in the digital image.

For example, the interpolation filter may be centered on a pixel associated with a void. The taps of the interpolation filter may weight grayscale or color values of pixels near the pixel associated with the void more than pixels further from the pixel associated with a void. The weighted values may be then summed (e.g., averaged) to calculate a color or grayscale value for the pixel associated with the void. The value of the pixel associated the void may be replaced with the calculated color or grayscale value. This process may be repeated for a plurality of pixels in the digital image associated with voids. In this regard, the filtering process fills in the voids in the digital image.

In some embodiments, the image processing system 502 might not perform localized filtering as a result of detecting the voids. Instead, the image processing system 502 may simply apply a filter such as the interpolation filter over the entire digital image without detecting the voids. An advantage of this approach is that processing time is saved because the image processing system does not need to detect the voids before applying the interpolation filter. A disadvantage of this approach is areas of the digital image not associated with a void may be blurred as a result of the filtering.

The image processing system 502 may use the filtered digital image to generate a surface profile which facilitates visualization of the peaks and troughs on the surface of the speaker spider.

Figure 8:
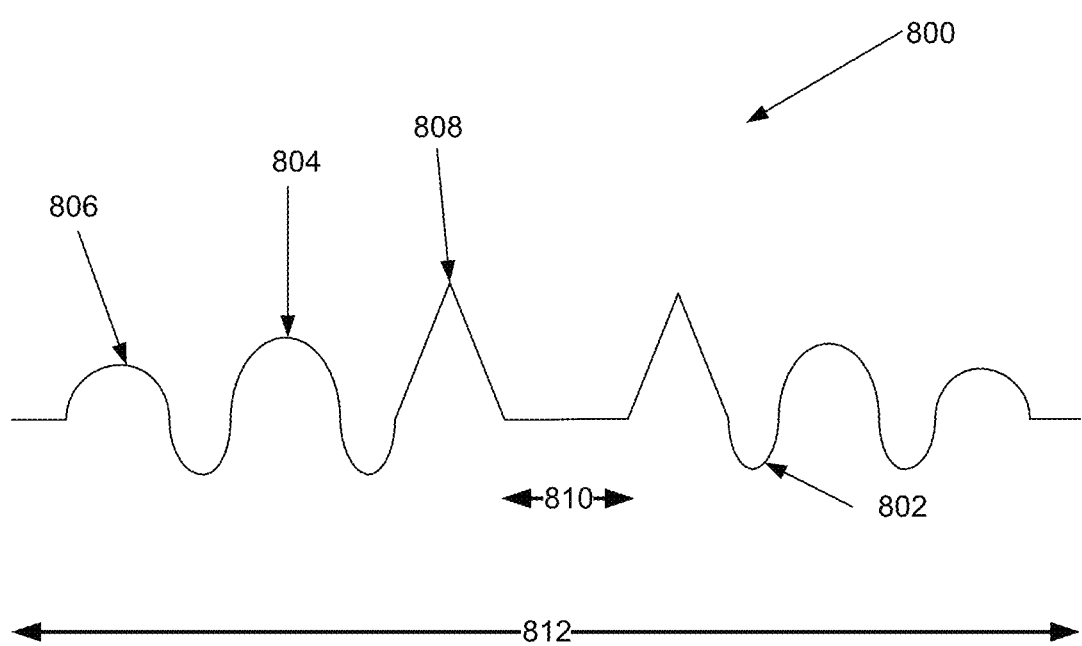
FIG. 8 shows an example of a surface profile of a fabricated speaker spider.

FIG. 8 shows an example of the surface profile 800 of the fabricated speaker spider. The surface profile may show a cross sectional view of the fabricated speaker spider. The surface profile may show details of troughs 802 and peaks 804, 806, 808 of the fabricated speaker spider, whether the peak or trough is sinusoidal 806, triangular 808 etc. and variations in the height and/or depth of each peak and/or trough. The surface profile may span from the inner diameter 810 to an outer diameter 812.

At 506, the image processing system 504 may determine features of the fabricated speaker spider based on the filtered digital image and/or surface profile.

In a first example, the filtered digital image may be analyzed to determine dimensions of the fabricated speaker spider. A distance between pixels may correspond to a spatial distance on the fabricated speaker spider. For example, a spatial distance between adjacent pixels may correspond to 1 mm of spatial distance on the fabricated speaker spider. The digital image may be processed using well known image processing techniques to identify the dimensions of the fabricated speaker spider. For example, the image processing system 504 may apply an edge detection filter to the digital image to identity an outline or boundary of the fabricated speaker spider and/or corrugations of the speaker spider. Then, a number of pixels between various points associated with the outline may be indicative of dimensions of the fabricated speaker spider, e.g., inner diameter 302, outer diameter 304, spatial distance between corrugations 204, 206, 208, width, circumference, curvature radius etc. of the speaker spider.

In a second example, the filtered digital image may be analyzed to determine a surface profile of the fabricated speaker spider, e.g., characteristics of the peaks and troughs on the surface of the fabricated speaker spider. The grayscale value or color value of a pixel may scale to a vertical distance from a surface of the speaker spider to the sensor. Variations in grayscale value or color value may correspond to variations in the surface profile of the fabricated speaker spider, e.g., a depth of troughs, height of peaks, shapes of toughs (e.g., sinusoidal, triangular), shapes of peaks (e.g., sinusoidal, triangular), elevation between a peak and trough, depth of corrugations, etc.

The image processing system 504 may receive the design criteria associated with the fabricated speaker spider from the design database 510. At 508, the features of the fabricated speaker spider may be compared to the design criteria. For example, the imaging system may determine a correlation, e.g., difference between one or more of an inner dimension, outer dimension of the fabricated speaker spider and corresponding dimensions indicated by the design criteria. For example, the imaging system may determine a correlation between spatial distances between corrugations of the fabricated speaker spider and corresponding distances indicated by the dimensions of the design criteria. For example, the imaging system may determine a correlation, e.g., difference between one or more of a shape, curvature radius of a trough/peak, depth of corrugations, a depth of troughs, height of peaks, and corresponding features indicated by the surface profile of the design criteria.

The correlation may indicate a closeness of match between the image of the fabricated speaker spider and the design criteria. In some embodiments, correlations associated with each feature may be combined together, e.g., averaged, to determine single correlation associated with the fabricated speaker spider. In some embodiments, the correlation associated with some features may be weighed depending on how a feature associated with a correlation affects longevity of the speaker spider and/or how objectionable audio distortions would be if the speaker spider is installed in a loudspeaker. For instance, correlations associated with spatial distances between corrugations may be weighted more than correlations associated with radii of troughs. For instance, correlations associated with an inner diameter may be weighted more than correlations associated with the outer diameter. Other arrangements are also possible.

A higher correlation may indicate that the fabricated speaker more closely matches the design criteria. A lower correlation may indicate that the fabricated speaker does not match the design criteria. In this regard, the correlation indicates whether the speaker spider may be faulty, i.e., a speaker spider that does not match design criteria may have a short lifetime in a loudspeaker. Additionally, or alternatively, the correlation may indicate whether problems exist in manufacture of the speaker spider, e.g., whether changes to tooling is needed to improve yield of properly fabricated speaker spiders.

The correlation may be compared to a predetermined threshold level. The predetermined threshold level may indicate a minimum correlation indicative of whether the speaker spider was fabricated properly. For example, if the correlation is below the predetermined threshold level, then the speaker spider might meet the design criteria and be fabricated properly. If the correlation is above the predetermined threshold level, then the speaker spider may not meet the design criteria and not be fabricated properly. In one example, a predetermined threshold level may be defined for a specific feature and be applied to the correlations associated with a specific feature. In another example, the predetermined threshold level may be defined for different features to be applied to correlations associated with the different features.

At 510, the imaging system may output an indication of whether the fabricated speaker spider meets or does not meet the design criteria. The indication may be presented on the user interface of the client station 512.

FIG. 9 is an example of the user interface 900 of the client station 512. The user interface 900 may be displayed on a display screen of the client station 512. The user interface 900 may indicate that a speaker spider does not meet the design criteria by displaying a message such as "Speaker Spider Failed." Additionally, or alternatively, the user interface 900 may specify the correlation(s) and threshold level(s) associated with the determination that the speaker spider failed to meet the design criteria. In the user interface of FIG. 9, the correlation value for a radius feature of the fabricated speaker spider (e.g., curvature radius of a trough or peak) is 30 and a threshold level is 10. The speaker spider failed to meet the design criteria because the correlation value was greater than the threshold level. Still additionally, or alternatively, the user interface 900 may display statistics of fabricated speaker spiders that met or did not meet design criteria. In the user interface of FIG. 9, three speaker spiders failed out of 1600 speaker spiders tested. The statistics may include absolute numbers as well as averages. Other arrangements are also possible.

In some embodiments, the user interface 900 may include a graphical representation of the speaker spider defined by the design criteria and/or a graphical representation of the fabricated speaker spider. The graphical representation of the speaker spider may be based on the reference drawing stored in the design database 510. The graphical representation of the fabricated speaker spider may be based on the digital image of the fabricated speaker spider. The graphical representations may facilitate a comparison of the speaker spider defined by the design criteria and the fabricated speaker spider. In some embodiments, the graphical representations of the speaker spider defined by the design criteria and the graphical representations of the fabricated speaker spider be overlaid on top of each other to further facilitate comparison. The overlay may illustrate (e.g., highlight) which portions of the fabricated speaker spider deviate from the speaker spider defined by the design criteria.

The method 500 may be performed for each speaker spider that is manufactured or for a sampling of the speaker spiders that are manufactured. In addition to identifying speaker spiders that fail to meet design criteria, the disclosed system may assist in identifying problems associated with manufacture of the speaker spider. For instance, if the dimensions of the speaker spider do not meet design criteria, then this might be suggestive of a failure of one machinery associated with fabrication of the speaker spider. On the other hand, if the surface profile of the speaker spider does not meet design criteria, then this might be suggestive of a failure of another machinery associated with fabrication of the speaker spider. Accordingly, the comparison may facilitate decisions on tooling for fabrication of the speaker spider.

The disclosed system 500 is not limited to determining whether a speaker spider meets design criteria. The disclosed system 500 may be used to determine whether some other soft or flexible component of a speaker meets design criteria. For example, the disclosed system 500 may determine whether a surround (e.g., surround 110, 152, or 166) or a dome of a tweeter meets the design criteria. The surround or dome of the tweeter may also be formed by weaving threads or formed from another flexible material such as rubber. The surround or dome may have a peak and/or curvature. The disclosed system may compare features of the surround or dome to corresponding design criteria.

As an example, the image processing system 504 may receive a digital image of a generally a soft or flexible fabricated component of a speaker (e.g., fabricated surround, fabricated dome). In the event that the fabricated component has holes, the digital image may be filtered, e.g., to fill in corresponding voids in the digital image. The component may be fabricated via a manufacturing process based on design criteria. The design criteria may specify one or more of dimensions of the fabricated component, a surface profile of the fabricated component, and/or a shape of the component. The image processing system 504 may determine features of the fabricated component based on the filtered digital image. The image processing system 504 may compare the features of the fabricated component to design criteria associated with the component. The image processing system 504 may output an indication of whether the fabricated component meets the design criteria.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

I claim:

1. A system comprising
a processor;
a non-transitory computer-readable medium; and
program instructions stored on the non-transitory computer-readable medium that, when executed by the processor, cause the system to perform functions comprising:
receiving a digital image of a fabricated speaker spider;
detecting voids in the digital image of the fabricated speaker spider corresponding to one or more pixels of the digital image, wherein detecting the voids is based on a comparison of a first color value of each of the one or more pixels of the digital image to a predetermined threshold color value;
filtering the digital image to fill in the voids in the digital image, wherein the voids in the digital image are indicative of holes in the fabricated speaker spider;
determining a feature of the fabricated speaker spider based on the filtered digital image;
comparing the feature to corresponding design criteria associated with the fabricated speaker spider; and
outputting an indication of whether the fabricated speaker spider meets the design criteria.

2. The system of claim 1, wherein receiving the digital image of the fabricated speaker comprises receiving the digital image from an optical microscope.

3. The system of claim 1, wherein the digital image comprises a plurality of pixels, and wherein the computer instructions for filtering the digital image comprises filtering pixels associated with the voids based on an interpolation filter.

4. The system of claim 1, wherein the design criteria is defined by a reference drawing associated with the fabricated speaker spider.

5. The system of claim 1, wherein the fabricated speaker spider is formed from a woven textile material.

6. The system of claim 1, wherein outputting an indication whether the fabricated speaker spider meets the design criteria comprises displaying the indication on a display screen of a client station.

7. The system of claim 1, wherein the fabricated speaker spider is a component of a loudspeaker.

8. The system of claim 1, wherein the feature is defined by a surface profile of the fabricated speaker spider.

9. A method comprising:
receiving a digital image of a fabricated speaker spider;
detecting voids in the digital image of the fabricated speaker spider corresponding to one or more pixels of the digital image, wherein detecting the voids is based on a comparison of a first color value of each of the one or more pixels of the digital image to a predetermined threshold color value;
filtering the digital image to fill in the voids in the digital image, wherein the voids in the digital image are indicative of holes in the fabricated speaker spider;
determining a feature of the fabricated speaker spider based on the filtered digital image;
comparing the feature to corresponding design criteria associated with the fabricated speaker spider; and
outputting an indication of whether the fabricated speaker spider meets the design criteria.

10. The method of claim 9, wherein receiving the digital image of the fabricated speaker comprises receiving the digital image from a non-contact imaging system.

11. The method of claim 9, wherein the digital image comprises a plurality of pixels, and wherein filtering the digital image comprises filtering pixels associated with the voids based on an interpolation filter.

12. The method of claim 9, wherein the design criteria is defined by a reference drawing of the speaker spider.

13. The method of claim 9, wherein comparing the feature to a corresponding design criteria associated with the fabricated speaker spider comprises comparing a dimension of the fabricated speaker spider to a corresponding dimension defined by the design criteria.

14. The method of claim 9, wherein outputting an indication of whether the fabricated speaker spider meets the design criteria comprises displaying the indication on a display screen of a client station.

15. The method of claim 9, wherein the fabricated speaker spider is a component of a loudspeaker.

16. A tangible non-transitory computer readable storage medium including instructions for execution by a processor, the instructions, when executed, cause the processor to implement a method comprising:
receiving a digital image of a fabricated speaker spider;
detecting voids in the digital image of the fabricated speaker spider corresponding to one or more pixels of the digital image, wherein detecting the voids is based on a comparison of a first color value of each of the one or more pixels of the digital image to a predetermined threshold color value;
filtering the digital image to fill in the voids in the digital image, wherein the voids in the digital image are indicative of holes in the fabricated speaker spider;
determining a feature of the fabricated speaker spider based on the filtered digital image;
comparing the feature to corresponding design criteria associated with the fabricated speaker spider; and
outputting an indication of whether the fabricated speaker spider meets the design criteria.

17. The system of claim 1, wherein filtering the digital image to fill in the voids in the digital image comprises:
adjusting the first color value of each of the one or more pixels of the digital image corresponding to the voids based on a reference color value corresponding to one or more reference pixels that are adjacent to the one or more pixels of the digital image corresponding to the voids, wherein the one or more reference pixels do not correspond to a void in the digital image, and wherein comparing the feature to the corresponding design criteria associated with the fabricated speaker spider comprises:

determining a second color value of each of one or more feature pixels of the digital image associated with the feature and comparing the feature to the corresponding design criteria based on the second color value.

* * * * *